United States Patent
Kubota et al.

[11] 3,967,882
[45] July 6, 1976

[54] LIQUID CRYSTAL DISPLAY DEVICE HAVING EXTENDED SERVICE LIFE

[75] Inventors: Kanemitsu Kubota, Suwa; Jin Nagasaki, Shimosuwa, both of Japan

[73] Assignee: Kabushiki Kaisha Suwa Seikosha, Tokyo, Japan

[22] Filed: Aug. 5, 1974

[21] Appl. No.: 495,008

Related U.S. Application Data

[63] Continuation-in-part of Ser. No. 242,003, April 7, 1972, abandoned.

[30] Foreign Application Priority Data

Apr. 9, 1971  Japan.................................. 46-22152

[52] U.S. Cl............................. 350/160 LC; 29/592
[51] Int. Cl.² ............................................. G02F 1/13
[58] Field of Search ...................... 350/150, 160 LC

[56] References Cited
UNITED STATES PATENTS

| | | |
|---|---|---|
| 3,661,444 | 5/1972 | Matthies ...................... 350/160 LC |
| 3,671,231 | 6/1972 | Haas et al. ................. 350/160 LC X |
| 3,736,047 | 5/1973 | Gelber et al. .................. 350/160 LC |
| 3,756,694 | 9/1973 | Soref et al. ..................... 350/160 LC |
| 3,799,651 | 3/1974 | Janning ......................... 350/160 LC |
| 3,854,793 | 12/1974 | Kahn ............................. 350/160 LC |
| 3,864,021 | 2/1975 | Katagiri et al. ................ 350/160 LC |
| 3,866,313 | 2/1975 | Yih .............................. 350/160 LC X |
| 3,881,809 | 5/1975 | Fergason et al. .............. 350/160 LC |

*Primary Examiner*—Edward S. Bauer
*Attorney, Agent, or Firm*—Blum, Moscovitz, Friedman & Kaplan

[57] ABSTRACT

A field-effect liquid crystal display device has cell plates, the interior surfaces of which are covered with a film of synthetic resin. The grooves required for optical activity of the liquid crystal material are in the synthetic resin. The construction of the cell is such that all volatiles including moisture can be driven off by heating and the system can be tightly sealed to keep it free of moisture. A method of assembly is disclosed.

10 Claims, 4 Drawing Figures

LIQUID CRYSTAL DISPLAY DEVICE HAVING EXTENDED SERVICE LIFE

CROSS REFERENCE TO RELATED APPLICATION

The present application is a continuation-in-part application of our application having the same title, filed Apr. 7, 1972 and having the Ser. No. 242,003 and now abandoned.

BACKGROUND OF THE INVENTION

A number of organic compounds which have the flow characteristics of liquids and yet which show crystalline properties have been known for about a century. These materials, known as liquid crystals, have recently received intensive investigation because of their usefulness in display devices operable at extremely low energy levels. In such display devices the physical nature and especially, the optical properties of the material can be changed by the application of electric or magnetic fields of sufficient strength.

Liquid crystals are classified roughly into three types, namely smectic, cholesteric and nematic. It is the nematic type of liquid crystal which has proved to be most useful for display devices; nematic crystals are divided into two classes, these classes differing somewhat in their optical properties and the differences being the basis for two different types of display systems. These are as follows:

1. A display in which a small current flows, the ions disturbing the crystallinity of the liquid crystal material and causing scattering of light. Although non-destructive over moderate periods of time, eventually, the current flowing through the system gives rise to oxidative or reductive degradation of the liquid crystal material and the electrodes.

2. If the liquid crystal molecules are placed in preferred orientations, the material is birefringent. Using proper techniques, the material, when placed between opposing plates, can be caused to rotate the plane of polarized light through a desired angle so that when used in combination with a pair of polarizing plates, the system can act as an optical shutter. To act as an optical shutter, the optical activity of the liquid crystal material must be eliminated. This can be done by imposing an electric field across the liquid crystal material.

The electro-optical properties of the nematic liquid crystals depend upon whether their dielectric anisotropy is positive or negative. Those used in the first type of display described above have negative dielectric anisotropy, whereas the liquid crystal materials or compositions utilized in the second type of display have positive dielectric anisotropy.

In nematic liquid crystals having positive dielectric anisotropy, a dipole is present which is essentially parallel with the principal axis of the molecule; when placed in an electric field of sufficient strength, the dipole aligns itself with the electric field, and consequently, the principal or macro-axis of the molecule likewise aligns itself with the electric field. In contrast, where the liquid crystal material is one whose dielectric anisotropy is negative, the direction of the electric dipole is essentially at right angles to the direction of the macro-axis of the molecule. Consequently, in the presence of an electric field the macro-axis will lie in a plane perpendicular to the electric field direction so that the orientation of the molecule is indeterminate.

To utilize a nematic liquid crystal material or composition having a net positive dielectric anisotropy, the liquid crystal is sealed between two transparent plates, on the inner surface of each of which are one or more transparent electrodes in the form of a mosaic or numerical segments. Prior to placing the plates in opposition, the surfaces are rubbed with gauze or absorbent cotton or the like, forming, it is believed, minute grooves. The rubbing is carried out in a single direction so that the grooves on a single plate are all parallel to each other. In mounting the plates together, they are set so that the rubbing directions on the two plates are at right angles to each other. The liquid crystal molecules immediately adjacent to each of the plates align themselves with the rubbing direction, that is, with the grooves. The liquid crystal molecules between the plates orient themselves into a helix the ends of which correspond with the rubbing directions on the plates. When the plates are at right angles to each other, the helix makes one-quarter turn, as a result of which linearly-polarized light traversing the cell is rotated through an angle of 90°. In the usual construction, such a cell is sandwiched between upper and lower polarizing plates or filters. Assuming the axes of the polarizing plates to be at right angles to each other, incident light will be transmitted through the cell due to the optical activity of the liquid crystal material between the plates of the cell. This assumes, of course, that no electric field is imposed across the cell.

When the axes of the polarizing plates are parallel to each other, no light will traverse the cell. However, if an electric field is applied to selected transparent electrodes on the upper and lower plates of the liquid crystal cell, as aforenoted, the liquid crystal composite will lose its optical activity because the macro-axis of the molecule will align itself parallel to the applied electric field. Now, assuming the polarizing filters to be placed at right angles to each other, as the optical activity is lost from those portions of the cell across which the electric field is imposed, those portions will become opaque while the remainder of the cell remains transparent. If the polarizing filters are parallel, the converse will take place.

Rubbing of the electrode surfaces prior to assembly of the cell plates into a cell with gauze, absorbent cotton or the like is believed to produce minute grooves in the surface of the cell plates. The liquid crystal molecules adjacent to the surface of the rubbed plate align themselves with the groove, that is, parallel to the rubbing direction. However, conventional rubbing techniques wherein the surfaces of the transparent electrodes as well as the surfaces of the glass plates are rubbed do not necessarily give uniform alignment over the entire exposed surface, due largely to the fact that impurities are present on the surface of the transparent electrodes and of the glass plates themselves. Even if the surfaces are cleaned very thoroughly prior to the rubbing operation, the alignment is imperfect. Accordingly, in production of such display cells the yield of satisfactory cells is limited and costs, consequently, are relatively high. Moreover, as the cell ages the liquid crystal material deteriorates in quality so that the light transmission therethrough as well as the contrast yielded by the display is impaired. These are the problems which the present invention is designed to overcome.

SUMMARY OF THE INVENTION

Tests have shown that the lack of reproducibility in display cells manufactured on a production basis and degradation of the system with aging are due to the fact that it is impossible to remove all of the contaminants present on the surface of the glass and to the fact that traces of moisture and volatile organic compounds are present at the time of fabrication of the display cell. The first difficulty is overcome by coating the surface of the plate with the transparent electrodes thereon with a thin film of a synthetic resin. Suitable synthetic resins may be anyone of the fluoroplastics, polyvinyl alcohol, polyesters, polyamides, silicones and polyimide polybenzimidazole. Virtually 100 percent yield is obtained in quantity production of the plates are coated thinly with one of these materials and subsequently rubbed with cotton or gauze. It should be noted that intensive cleaning of the surfaces prior to deposition of the film of synthetic resin is not needed since in the absence of such a cleaning step the yield is not decreased.

In order to eliminate moisture and organic volatile compounds, a spacer consisting of a polyester resin or of nylon is used. After assembling the plates with the spacer therebetween, the system is heated to a point where the spacer softens. The system is then compressed in order to make the spacer conform to the surface of the glass plates. The temperature is maintained until essentially all of the moisture and all of the organic volatiles present are driven from the system, at least one of the plates being preferably apertured to act as a vent for these volatile materials. The synthetic resin film used for covering the glass plates is selected so that its softening point is higher than the softening point of the resin used for the spacer.

The gap between the plates external to the spacer is sealed with an adhesive resin having a very low permeability to moisture. Suitable materials are the epoxy resins and silicones.

After the volatiles have been driven off the cell is filled with liquid crystal material or composition of positive dielectric anisotropy, the liquid crystal being free of moisture and volatile organic components. The cell should be filled rapidly and in as dry an atmosphere as possible in order to avoid contamination with moisture and other impurities from the air. The aperture in the plate is then plugged with a synthetic resin which is free of volatiles and moisture and which also has a high resistance to transmission of moisture therethrough.

To complete the display, the cell is sandwiched between polarizing filters, preferably having crossed axes. The performance is further improved by placing a white light-diffusing plate adjacent to one of the polarizing filters.

Accordingly, an object of the present invention is a field effect liquid crystal display device having extended service life.

Another object of the present invention is a field effect liquid crystal display device free of moisture and volatile organic compounds.

A further object of the present invention is a field effect liquid crystal display device which can be manufactured on a production scale at low cost.

An important object of the present invention is a field effect liquid crystal display device in which a synthetic resin film is grooved for orientation of the liquid crystal molecules rather than a glass surface.

A significant object of the present invention is a process for manufacture of a field effect liquid crystal display device having extended service life and which, during its life, is free of moisture and other volatile compounds in the interior of the cell.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in following detailed disclosure, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENT

The importance of the elimination of moisture and organic volatile materials from a liquid crystal cell has already been noted. Where moisture is present the impedance of the liquid crystal composition is reduced, relatively substantial currents are drawn and power consumption is increased. This last factor is particularly important in that the advantage of low power consumption realized in a properly prepared display device is lost. Moreover, the passage of current results in the generation of gases and degradative attacks both on the liquid crystal composition and on the electrodes so that the operable life of the system is shortened.

So far as organic volatiles are concerned, these would narrow the temperature range over which the composition is in the liquid crystal phase if present in the composition. Moreover, where the alignment of the liquid crystal composition is crucial, as in field-effect display devices, the degree of ordering is reduced, and eventually the display portion becomes opaque even in the absence of an electric field. Experiment has shown that exposure to a dry atmosphere, as in a desiccator, or vacuum pumping are not adequate for removal of volatiles. So far as moisture is concerned, water is not only strongly adsorbed on the surface of glass, this being the preferred material for the opposed plates making up the cell, but water actually constitutes one of the oxides of composition. Consequently, the surface can be dried adequately only by heating. Migration of water in the region immediately below the surface of the glass to the surface and then desorption are accelerated by temperature rise. So far as the organic volatiles are concerned, these are removed from the spacer and from sealant also at a reasonable rate only when the temperature is raised. Not only is the factor of diffusion involved, but frequently volatile materials are generated either as a principal reaction or as a side reaction in the curing of organic sealants used for excluding moisture from the cell.

Figure 1:
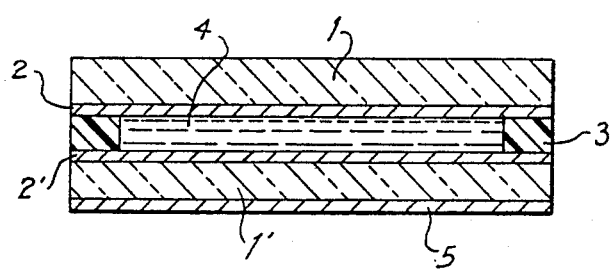
FIG. 1 is a sectional view of a liquid crystal cell in accordance with the prior art.

In order to be able to subject the cell of a liquid crystal display device to heat, the materials of which the cell is to be constructed must be selected so that the temperatures involved will not result in thermal degradation or excessive flow. A liquid crystal cell in accordance with the prior art is shown in FIG. 1, the cell shown being intended for use in the dynamic scattering mode. Plates 1 and 1' having conductive transparent electrodes 2 and 2' on the inner surfaces thereof are separated by spacer 3. A nematic liquid crystal composition, indicated by the reference numeral 4, fills the cell. A reflector 5 is positioned at the bottom of the cell to increase the visibility of the display.

While the glass plates, the electrodes and the reflector will tolerate the temperature required for driving off volatiles, including moisture, the cell construction is not such that the cells can be carefully dried first in preparation for incorporation of the liquid crystal composition. Moreover, without special precautions the seal between the spacer 3 and the plates is not such that the entry of moisture is permanently prevented. A further point is that the properties which make a particular composition suitable as a spacer do not necessarily make it suitable as a sealant. Finally it is necessary that consideration be given to the procedural steps by which a dry, volatile-free liquid crystal composition can be introduced into the cell and the cell then sealed against entry of undesired contaminants.

Figure 2:
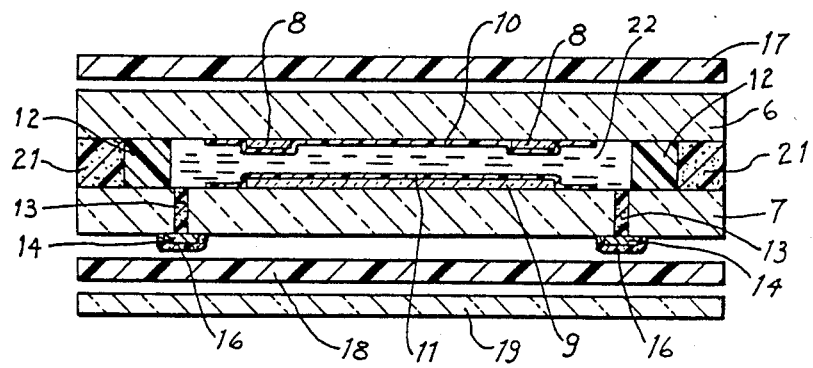
FIG. 2 is a sectional view of a field-effect liquid crystal display device in accordance with the present invention.
Figure 3:
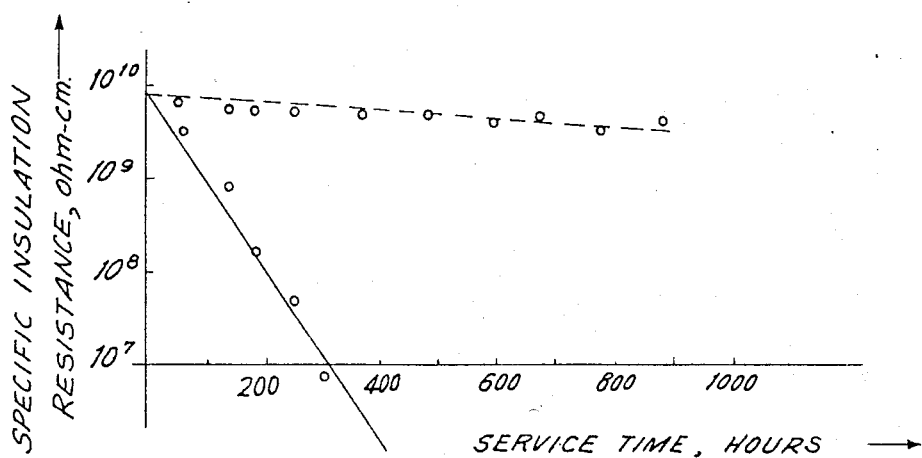
FIG. 3 is a graph showing the change in specific insulation resistance of a liquid crystal material in a display device of the prior art and in a display device in accordance with the present invention as a function of time.
Figure 4:
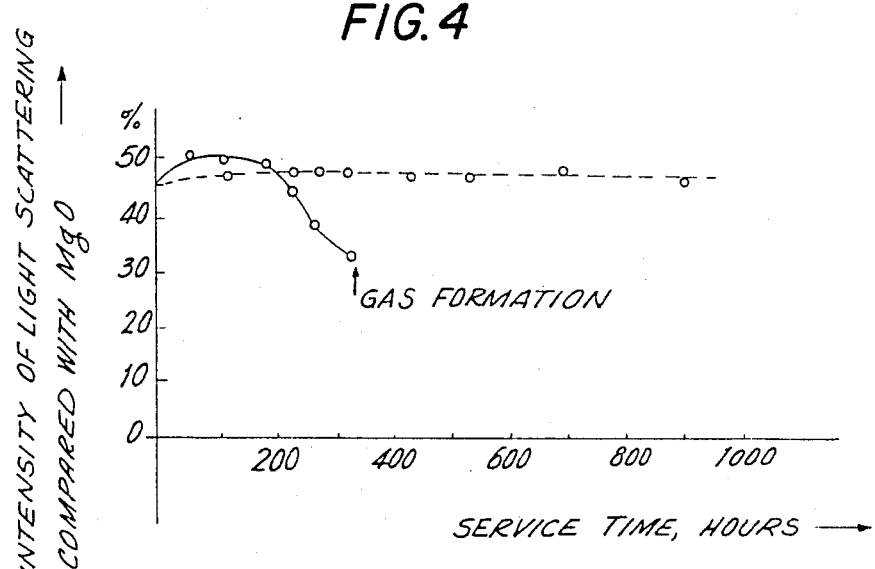
FIG. 4 is a graph showing the change in the intensity of light scattering as a function of time of liquid crystals in a device in accordance with the prior art and in a device in accordance with the present invention, dynamic scattering mode liquid crystal material being used for this comparison.

The liquid crystal display device shown in FIG. 2 includes a cell which can be freed of volatiles and which then can be filled with the liquid crystal material and sealed to exclude undesired contaminants. Glass plates 6 and 7 are opposed to each other. Each plate has on the inner surface thereof at least one transparent conductive electrode. Glass plate 6 has thereon transparent electrodes 8 and glass plate 7 has thereon transparent electrode 9. These electrodes usually are either of tin oxide or indium oxide. The electrodes and most of the remainder of the interior surfaces of plates 6 and 7 are covered with a thin film of a synthetic resin, the film on plate 6 being indicated by the reference numeral 10 and that on plate 7 being indicated by the reference numeral 11. An advantage of the use of the synthetic resin film is that the inner surfaces of the glass plates need not be intensively cleaned prior to deposition of the synthetic resin film. Also, since the cell is to be used in the field-effect mode, orientation of the surface is necessary. This orientation is induced in the film and not in the free surface of the glass plates or of the transparent electrodes. Suitable synthetic resins are the fluoroplastics, polyvinyl alcohol, polyesters, polyamides, silicones and polyimide polybenzimidazole. A preferred fluoroplastic is polytetrafluoroethylene (PTFE). PTFE is deposited by vacuum evaporation. The glass plate need not be heated during the deposition process. Powdered PTFE is placed in a tungsten boat through which sufficient current is passed to heat it to a vaporization temperature. The vacuum evaporation is carried out at a pressure of about $10^{-4}$ Tor. The thickness of the deposit is not critical and does not affect the alignment process provided it lies within a suitable range. However, the response speed of the system tends to be long when the deposit is too thick, so that it is preferable that the deposit be as thin as possible. The thickness can readily be judged by the naked eye by one skilled in the art. A preferred test is that the thickness be just such that it can be detected by the naked eye.

Transparent electrodes coated with PTFE in this manner are unidirectionally rubbed with absorbent cotton or gauze. Also, a suitable spacer, indicated by the reference numeral 12 in FIG. 2 is of polyester. The reason will become apparent.

In the case of PTFE this material responds very readily to rubbing since it has a very low coefficient of friction as compared to the transparent electrode upon which it is deposited.

Polyvinyl alcohol (PVA) cannot be deposited by vacuum evaporation because of thermal decomposition. Therefore PVA is deposited on the plate surface from an aqueous solution after which it is dried. PVA begins to decompose pyrolytically at about 200° and several tens of degrees C. For this reason nylon film is used as a spacer, a type of nylon being selected to have a softening temperature of about 190°C.

Polyester can be deposited by vacuum evaporation as readily as PTFE. Again, for polyester, a nylon film is used as a spacer. Polyester film has a high coefficient of friction; the display provided with a cell having an interior coated with polyester has a somewhat weaker contrast than does a cell coated with PTFE or PVA.

In general, the other synthetic resins can be deposited either from solution or by curing reactive compositions on the surface of the plate. In any case since part of the process of assembly of the cell will include heating of the spacer, it is necessary to use resins for the film coating whose softening temperatures are higher than the temperature at which the cell is to be decontaminated and at which the spacer is to be compressed.

An advantage in using synthetic resin film to be grooved by the rubbing operation rather than the plates themselves is that the grooves in the synthetic resin coating are long and smooth due to the plasticity of the resins. In contrast, grooves in the glass plates and in the electrodes tend to be short, intermittent and angular. The difference seems to affect the evenness of the alignment of the liquid crystal molecules, the alignment being superior when the synthetic resin films are grooved, and as a result, the uniformity and efficiency with which the plane of polarization is rotated is increased.

At least one of the plates has an aperture therethrough, the aperture being useful for introduction of carefully dried and devolatilized liquid crystal composition into the space between the plates. These apertures are then to be sealed with plastic plugs 13 of any convenient material free of volatiles. Suitable materials are the silicones and epoxies. Preferred are nylon and PTFE.

After the plates have been coated with the selected synthetic resin film and the synthetic resin films have been grooved by rubbing, the plates are mounted opposite each other with the rubbing directions on the two interior surfaces at right angles to each other. The spacer is preferably a polyester resin or a nylon resin, said spacer, as aforenoted, having a softening temperature lower than that of the synthetic resin film coat on the plates 6 and 7.

The thickness of the film coatings on the plates 6 and 7 can lie between several thousand A and several microns, although thicknesses at the lower end of the range are preferred. Obviously, then, the thickness of the spacer must be greater than the sum of the thicknesses of the films.

To free the interior of the cell of volatiles, including moisture, the cell is taken to a temperature intermediate the softening temperatures of the spacer and of the synthetic resin film on the surface of the plates. The cell is placed under pressure and compressed until the surface of the spacer conforms exactly to the surface of the glass plates. Preferably, the degree of compression is such that the thickness of the spacer is reduced by about 20 percent from the original thickness. The thickness of the spacer should be such that the final thickness of the free space between the symthetic resin films is between 5 and 20 microns. The cell is maintained at this temperature, say about 260°C in the case of a nylon spacer having a softening point below this temperature and a PTFE film coating on the glass plate having a softening point substantially above this temperature, until the interior of the system is essentially free of volatiles. The exact time necessary will depend on the thickness of the glass plates, their thermal conductivity and the quantity of volatiles present initially. In general, the process is sufficiently rapid that it can be carried out on a production scale. With a given system the time and temperature can readily be developed by one skilled in the art by observation of the quality of the product. The plates are allowed to cool sufficiently so that the liquiid crystal composition can be introduced through an aperture without decomposition of the material. The introduction of liquid crystal composition is carried out as rapidly as possible, and preferably in an atmosphere of as low humidity as possible. It is desirable that the humidity of the room be controlled, though this is not completely necessary.

It is convenient that there be two apertures so that one may serve as a vent while the liquid crystal composition is introduced through the other. Alternatively, the space between the plates can be evacuated and the liquid crystal composition drawn in using air pressure. With this arrangement, only one aperture is needed.

As soon as is conveniently possible a plastic plug 13 is introduced into the apertures and a plastic adhesive 21 used to seal the gap between plates 6 and 7 external to spacer 12. Suitable plastic adhesives are the epoxies and the silicones. For extra protection the exterior ends of the plastic plugs 13 are covered with small pieces of tape 14 and then additional plastic 16. The plastic 16, again, is preferably a silicone or an epoxy resin.

The silicones and epoxies are preferred because they form excellent seals to glass and also because of the fact that they have low permeabilities to moisture, as a result of which the interior of the system stays moisture-free permanently. Also, no volatiles are given off during the curing process so that they do not tend to contaminate the interior of the system.

Depending on the orientation of the system during plugging of the apertures, it may be desirable to avoid use of an epoxy or a silicone while soft. In such a case, the plugs 13 can be of a material like nylon or teflon, each piece having been formed to fit the aperture tightly. Placing the tape 14 and the plastic seal 16 over the tape then renders the aperture impervious to entry of moisture or other contaminants.

To complete the construction of the system, polarizers 17 and 18 are placed at opposite faces of the cell formed by glass plates 6 and 7. Also, the display is enhanced if a white light diffusor reflector 19 is placed at the exterior surface of one of the polarizer plates, in this case the polarizer plate 18. Where space is at a premium as in a quartz-crystal watch, plates 18 and 19 are contiguous and plates 17 and 6 are contiguous. It would also be desirable to be able to bring plate 18 into contact with plate 7. Where this is the objective, recesses are provided in the exterior surfaces of plate 7 so that tape 14 may lie below the surface and plastic seal 16 be flush with the surface (not shown). With this arrangement, polarizer plate 18 can be brought into contact with plate 7.

The preferred orientations of the axes of the polarizer plates 17 and 18 are at right angles to each other. In depositing the synthetic resin film on the surface of the glass plates, the deposition should be carried out so that as much of the surface of the plate is covered as possible. However, the film should not extend into the region at which the spacer is to be placed. This is particularly the case where the synthetic resin coating is of a fluoroplastic since these do not form good seals.

Where the liquid crystal display units are to be used in small devices such as wrist watches and portable calculators, the devices themselves are small. Consequently, it is possible to deposit a synthetic resin coating on a large number of plates at the same time. Further, since the spacer is to be compressed substantially during the heating operation, it is not necessary that its thickness be controlled with great precision. Consequently, it is possible to subject a large number of cells to thermocompression simultaneously, thereby cutting costs substantially.

It will thus be seen that the objects set forth above, among those made apparent from the preceding description, are efficiently attained and, since certain changes may be made in carrying out the above process and in the article set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of languate, might be said to fall therebetween.

What is claimed is:

1. A field-effect liquid crystal display device, comprising a pair of opposed glass plates, at least one transparent electrode on the inner surface of each of said glass plates, said transparent electrodes being connectable to an external source of voltage, nematic liquid crystals of positive dielectric anisotropy between said glass plates, said nematic liquid crystals being thoroughly dry and free of volatiles, an insulating spacer of a material deformable at elevated temperature between said glass places and conforming exactly to said inner surfaces of said glass plates, a sealant which is free of volatiles and is essentially impermeable to water vapor between said glass plates and exterior to said spacer, a film of a synthetic resin covering that portion of the inner surface of each glass plate interior to said spacer, said films being unidirectionally grooved and thereby oriented, said films being thick enough to be grooved and thin enough to interfere only negligibly with transmission of visible light therethrough, said glass plates being mounted opposite each other so that the directions of the grooves on said opposed plates are at right angles to each other and a pair of polarizer plates sandwiching said glass plates, the deformation temperature of said spacer material being lower than the melting and decomposition temperatures of said synthetic resin, and said spacer and the inner surfaces of said glass plates being essentially free of such organic compounds, water and water-of-composition of said glass plates as are volatile at temperatures at least as high as the deformation temperature of said spacer and below that at which said synthetic resin flows or is thermally degraded.

2. The field-effect liquid crystal display device as defined in claim 1 further comprising a white-light diffusor plate adjacent the exterior surface of one of said polarizer plates.

3. The field-effect liquid crystal display device as defined in claim 1 wherein at least one of said glass plates is apertured for convenience in introduction of liquid crystals therebetween, said apertures being tightly sealed with a composition essentially impermeable to moisture.

4. The field-effect liquid crystal display device as defined in claim 1 wherein said sealant is a member of the group consisting of epoxy resins and silicone resins.

5. The field-effect liquid crystal display device as defined in claim 1, wherein said spacer and said inner surfaces of said glass plates are free of such materials as are volatile at temperatures up to 260°C.

6. The field-effect liquid crystal display device as defined in claim 1 wherein said synthetic resin film is selected from the group consisting of fluoroplastic resins, polyvinyl alcohol, polyester resins, polyamides, silicones and polyimide polybenzimidazole.

7. The field-effect liquid crystal display device as defined in claim 6 wherein said synthetic resin film is selected from the group consisting of polytetrafluoroethylene, polyvinyl alcohol, and polyester.

8. The field-effect liquid crystal display device as defined in claim 6, wherein said spacer and said inner surfaces of said glass plates are free of such materials as are volatile at temperatures up to 260°C.

9. The field-effect liquid crystal display device as defined in claim 1 wherein said spacer is selected from the group consisting of polyester resins and nylon resins.

10. The field-effect liquid crystal display device as defined in claim 9, wherein said spacer and said inner surfaces of said glass plates are free of such materials as are volatile at temperatures up to 260°C.

* * * * *